United States Patent
Cao

(10) Patent No.: US 12,456,319 B2
(45) Date of Patent: Oct. 28, 2025

(54) SYSTEMS AND METHODS FOR MACHINE LEARNING KEY-VALUE EXTRACTION ON DOCUMENTS

(71) Applicant: TUNGSTEN AUTOMATION CORPORATION, Irvine, CA (US)

(72) Inventor: Hu Cao, Cypress, CA (US)

(73) Assignee: TUNGSTEN AUTOMATION CORPORATION, Irvine, CA (US)

(*) Notice: Subject to any disclaimer, the term of this patent is extended or adjusted under 35 U.S.C. 154(b) by 359 days.

(21) Appl. No.: 18/018,846

(22) PCT Filed: Jul. 30, 2021

(86) PCT No.: PCT/US2021/044030
§ 371 (c)(1),
(2) Date: Jan. 30, 2023

(87) PCT Pub. No.: WO2022/026908
PCT Pub. Date: Feb. 3, 2022

(65) Prior Publication Data
US 2023/0306768 A1    Sep. 28, 2023

Related U.S. Application Data

(60) Provisional application No. 63/059,872, filed on Jul. 31, 2020.

(51) Int. Cl.
| | |
|---|---|
| *G06V 30/19* | (2022.01) |
| *G06V 30/18* | (2022.01) |
| *G06V 30/412* | (2022.01) |
| *G06V 30/413* | (2022.01) |

(52) U.S. Cl.
CPC .. *G06V 30/19147* (2022.01); *G06V 30/18181* (2022.01); *G06V 30/19173* (2022.01); *G06V 30/412* (2022.01); *G06V 30/413* (2022.01)

(58) Field of Classification Search
CPC .. G06V 30/268; G06V 30/412; G06V 30/413; G06V 30/18181; G06V 30/19147; G06V 30/19173; G06F 16/35; G06F 18/214; G06F 40/279
See application file for complete search history.

(56) References Cited

U.S. PATENT DOCUMENTS

| | | | |
|---|---|---|---|
| 9,773,166 B1* | 9/2017 | Connor | G06N 20/00 |
| 10,699,112 B1 | 6/2020 | Corcoran et al. | |
| 10,936,820 B2* | 3/2021 | Schäfer | G06F 18/2185 |

(Continued)

OTHER PUBLICATIONS

International Search Report and Written Opinion from PCT Application No. PCT/US21/44030, dated Dec. 23, 2021.

*Primary Examiner* — Daniel G Mariam
(74) *Attorney, Agent, or Firm* — Zilka-Kotab, P.C.

(57) ABSTRACT

A machine learning based key-value extraction model extracts fields/entities from documents. The input images are processed through OCR. A list of words (uni-grams) and their coordinates are extracted from the original images. Following word cleaning and manipulation, n-gram creation (multi-words), and feature engineering, the transformed data is fed into a classification algorithm to predict if a uni-gram or n-gram is one of the target entities or a non-entity. Following the first step that includes unique feature engineering, a second step improves extraction accuracy among the fields/entities.

13 Claims, 9 Drawing Sheets

(56) References Cited

U.S. PATENT DOCUMENTS

| | | | |
|---|---|---|---|
| 11,216,896 B2* | 1/2022 | Stauffer | G06F 16/93 |
| 2009/0222395 A1 | 9/2009 | Light et al. | |
| 2010/0235369 A1* | 9/2010 | Evanitsky | G06Q 10/10 707/756 |
| 2016/0239487 A1 | 8/2016 | Potharaju et al. | |
| 2020/0151201 A1 | 5/2020 | Chandrasekhar et al. | |

* cited by examiner

FIG. 1

Acme

4470 Sunset Blvd, Los Angeles, CA 90027
Voice: 866-692-2789

Fax: 866-692-4589

Invoice

Invoice
67391
Invoice Date:
Jan 31, 2014
Page:
1

Sold To:

Wayne Manufacturer
PO Box 332
Email Invoices##
Wall Township, NJ 07719

Ship To:

Wayne Factory
6315 N Keystone Ave, Suite A
Attn:PO#JKL-LEG-23983-0012938
Wall Township, NJ 07719

| Customer ID | Customer PO | Payment Terms |
|---|---|---|
| WAYNE | A42 | Net 30 Days |

| Tax Code | Sales Order # | Shipping Method | Ship Date | Due Date |
|---|---|---|---|---|
| 900-NJ | 12345 | FixPy Grd 394439758 | 1/31/14 | 3/2/14 |

| Qty Ordered | Qty Shipped | Item | Description | Unit Price | Total |
|---|---|---|---|---|---|
| 1.00 | 1.00 | MS-SRT250PE | Track# 488295195899<br>Water Sample Bottles, 250ml, Polyethylene with Sodium Thiosulfate and Tamper Label, Sterile, 226/Case, Lot L13323 | 16.28 | 16.28 |

Notices - INVOICES - SHIPMENTS - PROMOTIONS

*At Acme, we always strive to provide the best possible service to our customers. E-invoices are an excellent alternative to mailed hard copies. Please provide your e-mail address and we would be happy to send your invoice via e-mail that can print exactly like the current paper invoice that you receive.*

Subtotal 16.28
Sales Tax
Freight
Total Invoice Amount 16.28

THANK YOU FOR YOUR ORDER - WE APPRECIATE YOUR BUSINESS

| Predicted / TRUE | other | Invoice No | PO No | Invoice Date | Due Date | Order Date | Ship Date | Terms | Sub Total | Tax Rate | Tax Amount | Total Amount | Amount Due | Tax Id |
|---|---|---|---|---|---|---|---|---|---|---|---|---|---|---|
| other | 146369 | 988 | 521 | 555 | 165 | 9 | 83 | 865 | 211 | 45 | 861 | 1215 | 114 | 71 |
| Invoice No | 9 | 745 | 2 | 1 | 0 | 0 | 0 | 0 | 0 | 0 | 0 | 0 | 0 | 0 |
| PO No | 13 | 1 | 287 | 0 | 0 | 0 | 0 | 2 | 0 | 0 | 0 | 0 | 0 | 0 |
| Invoice Date | 0 | 4 | 0 | 545 | 2 | 0 | 1 | 1 | 0 | 0 | 0 | 0 | 0 | 0 |
| Due Date | 4 | 0 | 0 | 6 | 243 | 0 | 0 | 0 | 0 | 0 | 0 | 0 | 0 | 0 |
| Order Date | 1 | 0 | 1 | 3 | 0 | 59 | 0 | 0 | 0 | 0 | 0 | 0 | 0 | 0 |
| Ship Date | 0 | 0 | 0 | 1 | 1 | 0 | 34 | 0 | 0 | 0 | 0 | 0 | 0 | 0 |
| Terms | 10 | 0 | 0 | 0 | 0 | 0 | 0 | 326 | 0 | 0 | 0 | 0 | 0 | 1 |
| Subtotal | 3 | 0 | 0 | 0 | 0 | 0 | 0 | 0 | 221 | 0 | 11 | 44 | 1 | 0 |
| Tax Rate | 5 | 0 | 0 | 0 | 0 | 0 | 0 | 0 | 0 | 99 | 0 | 0 | 0 | 0 |
| Tax Amount | 6 | 0 | 0 | 0 | 0 | 0 | 0 | 0 | 1 | 0 | 227 | 7 | 0 | 0 |
| Total Amount | 3 | 0 | 0 | 0 | 0 | 0 | 0 | 0 | 5 | 0 | 0 | 512 | 1 | 0 |
| Amount Due | 1 | 0 | 0 | 0 | 0 | 0 | 0 | 0 | 5 | 0 | 1 | 25 | 316 | 0 |
| Tax Id | 5 | 4 | 0 | 0 | 0 | 0 | 0 | 0 | 0 | 0 | 0 | 0 | 0 | 222 |

| Predicted / TRUE | other | Invoice No | PO No | Invoice Date | Due Date | Order Date | Ship Date | Terms | Sub Total | Tax Rate | Tax Amount | Total Amount | Amount Due | Tax Id |
|---|---|---|---|---|---|---|---|---|---|---|---|---|---|---|
| other | 150369 | 181 | 135 | 282 | 26 | 5 | 57 | 142 | 73 | 5 | 145 | 382 | 45 | 24 |
| Invoice No | 17 | 739 | 1 | 1 | 0 | 0 | 0 | 0 | 0 | 0 | 0 | 0 | 0 | 0 |
| PO No | 25 | 0 | 287 | 0 | 0 | 0 | 0 | 1 | 0 | 0 | 0 | 0 | 0 | 0 |
| Invoice Date | 6 | 1 | 0 | 541 | 4 | 0 | 1 | 0 | 0 | 0 | 0 | 0 | 0 | 0 |
| Due Date | 6 | 0 | 0 | 6 | 241 | 0 | 0 | 0 | 0 | 0 | 0 | 0 | 0 | 0 |
| Order Date | 1 | 0 | 0 | 4 | 0 | 59 | 0 | 0 | 0 | 0 | 0 | 0 | 0 | 0 |
| Ship Date | 0 | 0 | 0 | 1 | 1 | 0 | 34 | 0 | 0 | 0 | 0 | 0 | 0 | 0 |
| Terms | 18 | 0 | 0 | 0 | 0 | 0 | 0 | 319 | 0 | 0 | 0 | 0 | 0 | 0 |
| Subtotal | 33 | 0 | 0 | 0 | 0 | 0 | 0 | 0 | 208 | 0 | 2 | 36 | 1 | 0 |
| Tax Rate | 10 | 0 | 0 | 0 | 0 | 0 | 0 | 0 | 0 | 94 | 0 | 0 | 0 | 0 |
| Tax Amount | 20 | 0 | 0 | 0 | 0 | 0 | 0 | 0 | 0 | 0 | 219 | 2 | 0 | 0 |
| Total Amount | 5 | 0 | 0 | 0 | 0 | 0 | 0 | 0 | 5 | 0 | 0 | 510 | 1 | 0 |
| Amount Due | 7 | 0 | 0 | 0 | 0 | 0 | 0 | 0 | 3 | 0 | 2 | 23 | 313 | 0 |
| Tax Id | 13 | 2 | 0 | 0 | 0 | 0 | 0 | 0 | 0 | 0 | 0 | 0 | 0 | 218 |

FIG. 5C

ND METHODS FOR MACHINE
SYSTEMS AND METHODS FOR MACHINE LEARNING KEY-VALUE EXTRACTION ON DOCUMENTS

INCORPORATION BY REFERENCE TO ANY PRIORITY APPLICATIONS

This application is a National Stage Filing pursuant to the Patent Cooperation Treaty (PCT) and claims priority to International Application No. PCT/US2021/044030, entitled "SYSTEMS AND METHODS FOR MACHINE LEARNING KEY-VALUE EXTRACTION ON DOCUMENTS" filed Jul. 31, 2021, which is hereby incorporated by reference in its entirety. This application also claims priority to U.S. Provisional Patent Application Ser. No. 63/059,872 entitled "SYSTEMS AND METHODS FOR MACHINE LEARNING KEY-VALUE EXTRACTION ON DOCUMENTS" filed Jul. 31, 2020, which is hereby incorporated by reference in its entirety.

BACKGROUND

In the area of computer-based platforms, data can be extracted from scanned documents, such as scanned images of invoices, purchase orders, packing slip, bills of lading, contracts, etc.

BRIEF DESCRIPTION OF THE DRAWINGS

FIG. 1 illustrates an example n-gram creation, according to some embodiments of the present disclosure.

FIG. 2 illustrates an example document, according to some embodiments of the present disclosure.

FIG. 5B illustrates a confusion matrix of prediction on the holdout data under a model, according to some embodiments of the present disclosure.

FIG. 5C illustrates another confusion matrix of prediction on the holdout data under another model, according to some embodiments of the present disclosure.

SUMMARY

Figure 3:
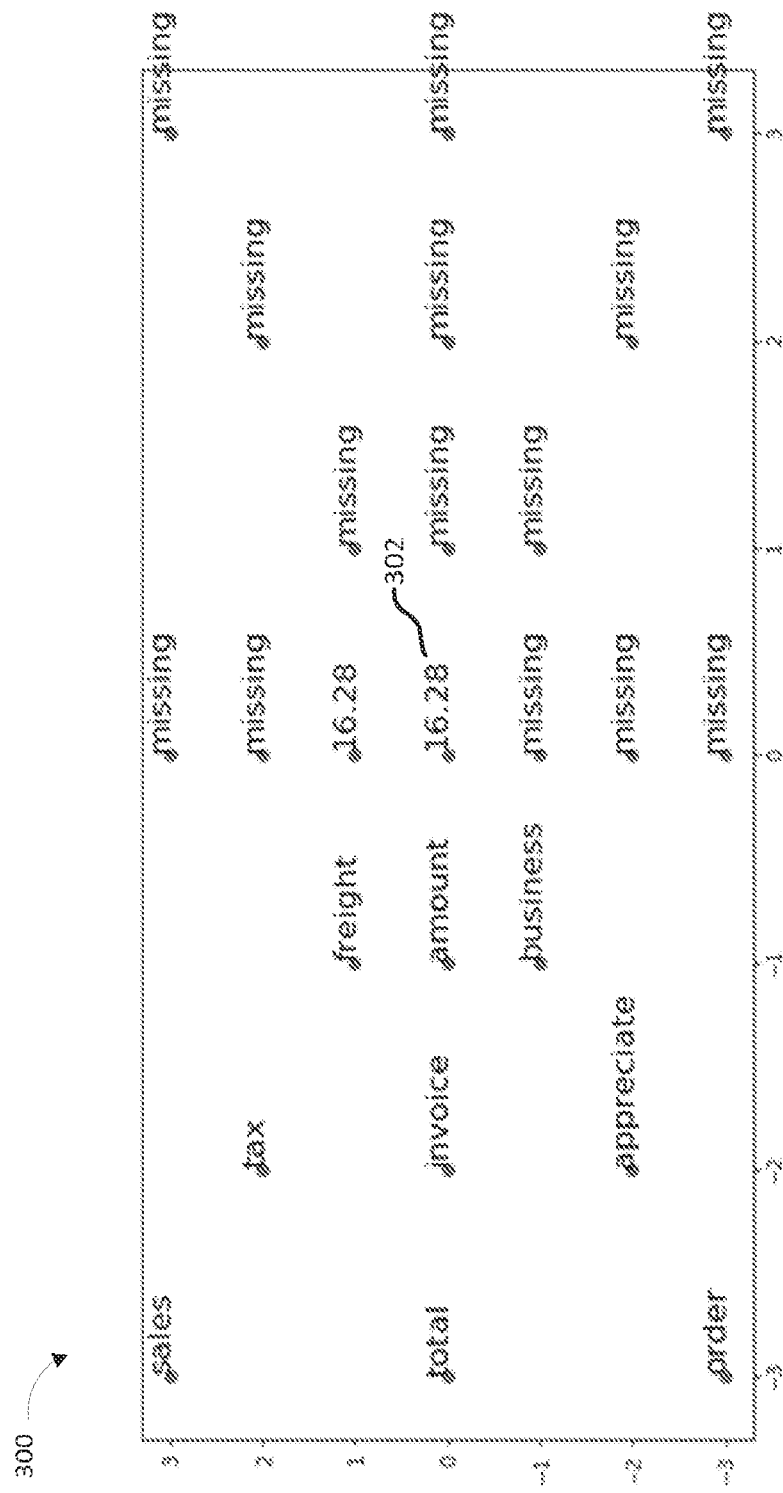
FIG. 3 depicts a visual representation of an example graph-like data structure, according to some embodiments of the present disclosure.

The systems, methods, and devices described herein each have several aspects, no single one of which is solely responsible for its desirable attributes. Without limiting the scope of this disclosure, several non-limiting features will now be discussed briefly.

According to an embodiment, a method to train a machine-learning model to extract key-values from documents is disclosed comprising: receiving a collection of training document images; creating a training data set from the collection; and training a classification model using the training data set, wherein training the classification model further comprises applying at least a plurality of features to the training data set, the plurality of features comprising: a first feature corresponding to a location of an n-gram, a second feature corresponding to letter case, a third feature corresponding to textual character type, a fourth feature corresponding to a regular expression, a fifth feature corresponding to a number of characters, and a sixth feature corresponding to punctuation.

According to an aspect, the method may further comprise; applying optical character recognition to a document image, wherein applying optical character recognition outputs a plurality of document objects; applying threshold values to priors of the plurality of document objects; determining, from the plurality of document objects, a subset of document objects based at least in part on some of the priors of the plurality of document objects not satisfying the threshold values; and applying the classification model to the subset of document objects.

According to another aspect, applying optical character recognition to a document image, wherein applying optical character recognition outputs a plurality of document objects; and applying the classification model to the plurality of document objects, wherein applying the classification model further comprises: outputting entities and non-entities with corresponding probabilities indicating a likelihood of correctness for each entity and non-entity.

According to another embodiment, a system is disclosed comprising: a data store configured to store computer executable instructions; and a hardware processor in communication with the data store, the computing device, when executing the computer executable instructions, configured to: receive a collection of training document images; create a training data set from the collection; and train a classification model using the training data set, wherein training the classification model further comprises applying at least a plurality of features to the training data set, the plurality of features comprising: a first feature corresponding to a location of an n-gram, a second feature corresponding to letter case, a third feature corresponding to textual character type, a fourth feature corresponding to a regular expression, a fifth feature corresponding to a number of characters, and a sixth feature corresponding to punctuation.

According to an aspect, the first feature may correspond to the location of the n-gram uses a graph-like data structure.

According to another aspect, the graph-like data structure may indicate the nearest words neighboring the location of the n-gram.

According to yet another aspect, the second feature may correspond to letter case indicates numerical and non-numerical character types.

According to yet another aspect, the hardware processor may be further configured to execute further computer-executable instructions to: apply optical character recognition to a document image, wherein applying optical character recognition outputs a plurality of document objects; apply threshold values to priors of the plurality of document objects; determine, from the plurality of document objects, a subset of document objects based at least in part on some of the priors of the plurality of document objects not satisfying the threshold values; and apply the classification model to the subset of document objects.

According to yet another aspect, the hardware processor may be further configured to execute further computer-executable instructions to: apply optical character recognition to a document image, wherein applying optical character recognition outputs a plurality of document objects; and apply the classification model to the plurality of document objects, wherein applying the classification model further comprises: outputting entities and non-entities with corresponding probabilities indicating a likelihood of correctness for each entity and non-entity.

According to an embodiment, a method to improve, post-extraction, classification accuracy of key-values after a machine-learning model has been applied to documents, is disclosed comprising: receiving a collection of document images; creating an input data set from the collection; applying a classification model to the input data set that generates an initial set of entity predictions; and filtering the initial set of entity predictions that generates a revised set of entity predictions, wherein filtering the initial set of entity predictions further comprises applying at least a plurality of rules to the initial set of entity predictions, the plurality of rules comprising: a first rule corresponding to treating each individual entity as unique, a second rule corresponding to treating a single document as unique, a third rule corresponding to a threshold level for entity probabilities, a fourth rule corresponding to selection of an entity with a highest probability for each class, and a fifth rule corresponding to prioritizing entity selection of a largest multi-gram from a plurality of multi-gram candidates.

According to an aspect, creating the input data set from the collection may further comprise: applying optical character recognition to a document image of the collection, wherein applying optical character recognition outputs a plurality of document objects, the input data set comprising the plurality of document objects.

According to an aspect, a document object of the plurality of document objects may comprise a line object with multiple unigrams on a same line with a distance between adjacent unigrams less than a value.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Data extraction on documents, such as invoices, purchase orders, packing slip, bills of lading, contracts, etc., is a technically challenging task. It usually involves long processing times, labor-intensive processes, error-prone procedures, and high labor costs. In those organizations, some fields of interest, such as invoice number, purchase order (PO) number, dates, and dollar amounts can be manually examined and entered. Existing template-based Optical Character Recognition (OCR) and/or rule-based Named Entity Recognition (NER) can be slow, expensive, and/or inaccurate. These existing techniques are typically designed for limited document types, content layouts, and field formats.

Accordingly, improved data extraction techniques described herein can process a high variety of document types, content layouts, and/or field formats with greater accuracy using artificial intelligence, and, in particular, machine learning.

The machine learning based key-value extraction model techniques described herein can extract fields/entities from documents. Example documents can include, but are not limited to, invoices, purchase orders, packing slip, bills of lading, and contracts. Example fields/entities can include Invoice Number, PO Number, Invoice Date, Due Date, Ship Date, Order Date, Terms, Tax ID, Subtotal, Tax Amount, Tax Rate, Total Amount, and Amount Due. The raw inputs can be images, such as JPEG images of invoices. The input images can be processed through OCR (such as AWS® Textract). A list of words (uni-grams) and their coordinates can be extracted from the original images. Following word cleaning and manipulation, n-gram creation (multi-words), and feature engineering, the transformed data can be fed into a classification algorithm (such as XGBoost) to predict if a uni-gram or n-gram is one of the target entities or a non-entity. Following the first step that includes unique feature engineering, a second step can improve extraction accuracy (for example, above 94.5%) among the fields/entities. The techniques described herein can be applied to any document with key-values, such as any financial statement, medical record document, etc., in any language. Aspects of the improved techniques can include data preparation, feature engineering, model training, and/or a two-step extraction approach, as described herein. Some or all of the data preparation and/or feature engineering steps can be applied to both the data for training and/or to the data for classification.

As used herein, in addition to its ordinary and customary meaning, an "entity" can refer to a particular value for a particular key. An example key-value pair can be (Account Number, 12345). Thus, in the example, a particular Account Number entity is 12345. A different Account Number entity could be 45668.

The improved techniques described herein can provide flexibility. For example, more fields can be added as wanted. To add new fields, new labeled bounding boxes can be added to the training set and then a new model can be retrained. This approach also makes the self-learning feasible. Adding more failed instances and/or entities, and retraining the model can be used to improve the model performance with minimum of human effort.

The improved techniques described herein can provide extensibility. The approaches described herein can be easily extended to other types of documents if they are key-value based ones. These techniques can be applied to documents in languages other than English.

The improved techniques described herein can solve a very challenging problem in document entity recognition, namely, extremely imbalanced entity extraction.

I. Data Preparation

The machine learning techniques described herein can be supervised machine learning. Accordingly, training data can be prepared to train the model. A holdout dataset can be used to further benchmark the output model. An example training dataset can include one, two, three, four, or five thousand PDF documents. An example holdout dataset can include three, four, five, six, or seven hundred PDF documents.

1. Image Processing and Text Retrieval

The raw documents can be in a PDF format or scanned images. The documents can be converted to a formatted image (e.g., JPEG) with a particular dots per inch (dpi), such as 300 dpi, for input into an OCR engine. The OCR engine can output text and coordinates of the text, which can be in a JSON data format. The formatted OCR output can be the input for the extraction model. Before providing the OCR output to the machine learning model, the output can be parsed, analyzed, and/or processed.

2. OCR Parsing and/or Text Processing

The OCR output can include many types of data objects, such as BlockType objects (which can be an AWS object format). Example objects, such as WORD and LINE objects, can parsed and processed. Feature engineering can be applied to the objects. The WORD object can be a uni-gram or word, while the LINE object can be continuous uni-grams on the same line with the distance between adjacent uni-grams less than a value, such as 1-2 white spaces. Each WORD can have an identifier (ID), while each LINE can have an identifier (ID) that can point to the WORD IDs in that LINE. IDs can be helpful for tracking and indexing and can be used in the feature generation. IDs can be unique.

3. Preparing Labeled Entities

Since the document extraction can be a supervised machine learning classification. The response variable (also known as the response variable Y) can be prepared, which can include manual work. In each document, the target fields can be carefully identified. A bounding box can be drawn around the value of the field (not key). If a field exists but its value was empty, a bounding box can advantageously be drawn at the right place. Even if a value was missing in the key-value pair, its spatial orientation and/or alignment can be helpful indicative patterns, which can be identified by the machine learning algorithm. An appropriate value can be backfilled, as described herein.

The training data set can be properly labeled. A target labeling accuracy can be above a particular threshold, such as 95%. Recall and/or Precision can be calculated to check the labeling quality for a random subset of the training documents.

II. Feature Engineering

1. Text Processing

The text can be processed, which can include cleaning, removing, manipulating, and/or creating text. For each WORD and/or LINE, the original text and/or its lower case text can be used during the text processing to serve one or more different purposes in feature generation. Word cleaning and processing can be used to reduce variations. The word cleaning and processing can focus on the target entities to effectively increase model accuracy.

a. Word Cleaning

Word cleaning can be performed for variation reduction. Example word cleaning can include the following.

One or more redundant words and/or punctuations may be removed, such as 'number' and its variations {e.g., '#', 'num', 'no', 'id', 'no.'), currency signs (e.g., '$', 'USD', 'AUD', etc.}, and punctuations {e.g., [ ], { }, ( ), @, :, #, '', ', ; , *, |, /,} The deletions can be selected as to not affect the entities to be extracted. For example, removing some special punctuations like {,.–/} could result in the failure in some entity recognition because they are widely used in dollar entities, date entities, and identifier entities. In other word, some words and/or punctuation may not be deleted, such as {,.–/}.

One or more shortened word forms may be replaced with their full words, such as, but not limited to, {'inv': 'invoice', 'acct': 'account', 'cust': 'customer', 'purch': 'purchase', 'ord': 'order', 'amt': 'amount', etc.}.

One or more key variations of words may be grouped together and treated as a single entity, such as ('tax': ['Fed', 'EIN', 'FEIN']). For example, any one of ['Fed', 'EIN', or 'FEIN' can be replaced with 'tax.'

One or more non-sense strings or text incorrectly recognized from non-text images, such as barcodes, can be removed.

One or more stop words can be identified and removed using a natural language processing tool (such as Natural Language Toolkit or NLTK). Some special stop words can be kept, such as, but not limited to, {'on', 'by', 'to', 'in', 'before', 'after', 'for', 'm', 'a', 'd', 'I', 'o', 's', 't', 'y'}. Keeping some stop words can be important because some stop words can be included in an entity, such as Invoice Number: ('12345-m').

Inflected forms of a word can be lemmatized and grouped together so that they can be analyzed as a single item, such as ('invoice':['invoiced', 'invoicing']).

b. Spell Check and/or OCR Correction

Typically, the OCR recognition rate is not guaranteed to be 100% accurate, especially for poor-quality images. Therefore, some post-processing can be helpful. For example, during the initial OCR, 'invoice' can be recognized as 'inveice' and 'P.O.' can be recognized as 'RO.' The former can be corrected using the uni-gram spell check and the latter can be corrected using a bi-gram 'PO Box'. A Levenshtein Distance can be used for the spell check, which is a string metric for measuring the difference between two sequences. Example thresholds can include: a minimum of 5 characters of a string and a ratio of 0.80, defined as (1.0–Levenshtein Distance/String Length). Under these example conditions, 1-2 letters can be corrected. For spell check accuracy, the choice of the lookup dictionary can be important. A traditional dictionary like Merriam-Webster may not be a good choice because it can cause overcorrection. Therefore, a custom lookup dictionary can be created and used. A custom lookup dictionary can be prepared from a collection of all regular words from a sample set of documents, such as the training set and/or holdover documents. A customized lookup dictionary can be used for key-value extraction because only correction for misrecognized keys may be important. The custom dictionary can include misspelled words. In the custom dictionary, particular keys will likely be the most frequent items. The process of looking up candidates of a uni-gram or bi-gram from the custom dictionary can prioritize the uni-grams or bi-grams with the largest frequency (or probability). This process can correct misrecognized keys that occurred during the OCR, especially in poor images.

c. N-Gram Creation (e.g., Up to Five-Gram)

Figure 1:
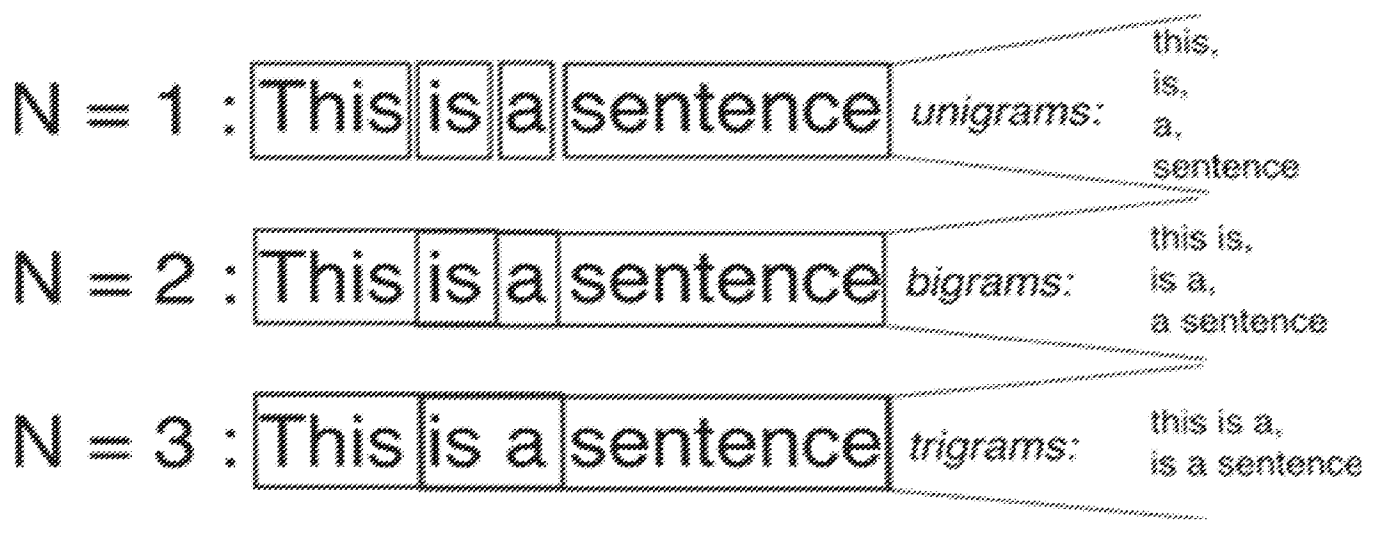

An entity may not always be a single string or uni-gram. In some cases, it could be an n-gram. For example, with invoices or similar documents, entities such as Terms and/or PO Numbers may be n-grams. For example, an example Term entity can be a tri-gram 'Net 30 Days'. If the key ('Payment Terms') and value ('Net 30 Days') are well separated, the OCR would return two LINE items, 'Payment Terms' and 'Net 30 Days'. The process can treat the tri-gram as a WORD item and the model can catch this full entity. But what if the key and value happen to be a single LINE item, like 'Payment Terms: Net 30 Days'? First, the model may fail to classify 'Payment Terms: Net 30 Day' to be a right entity of Terms, because of the direct key hidden in it. Second, the Terms are supposed to be 'Net 30 Days', not 'Payment Terms: Net 30 Days'. One solution is to create a series of n-grams so that the key and value can be separated out. FIG. 1 shows a demonstration of how to create uni-, bi- and tri-grams out of a sentence.

In the Payment Terms example, several uni-grams, bi-grams, tri-grams, four-grams, and five-grams can be generated. For example: uni-grams ('Payment', 'Terms', 'Net', '30', 'Days'); bi-grams {'Payment Terms', 'Terms Net', 'Net 30', '30 Days'}; tri-grams ('Payment Terms net', 'terms net 30', 'Net 30 Days'); four-grams ('Payment Terms Net 30', 'Terms Net 30 Days'); and five-grams ('Payment Terms Net 30 Days'). In the example, the direct key, 'Terms', is exactly on the left side of a uni-gram of 'Net', bi-gram of 'Net 30' and tri-gram of 'Net 30 Days'. The model may classify three of them as candidates of terms. Selection of one of the candidates by the model can occur during post-extraction, as described herein. In some embodiments, a maximum 5-grams can be created, which can cover full values for the target entities.

d. Manipulation

Data can be manipulated to improve the machine learning classification. Machine learning classification can include pattern recognition. To facilitate accurate key-value pair detection, the training data can be sufficiently robust by including sufficient occurrences. However, there may be limited instances for some entities, such as ship date, order date, or tax ID. Furthermore, some entities may have a few variants of a key, where some variants are dominant, and some are minor in the training data. The latter may not be identified during the model training. For example, Ship Date may have two key variants, 'Ship Date' or 'Date Ship' (after the word cleaning). The former can be observed frequently in invoices while the latter may be observed less. Replacing 'Date Ship' with 'Ship Date' would have the model catch it accurately. The other similar case is to replace 'Sub Total' as 'Subtotal Subtotal' since it is a bi-gram. After replacing, the first nearest word by a dollar amount is 'Subtotal', the direct key for Subtotal. Otherwise, the dollar amount may be identified as Total Amount, because the first nearest word is 'Total' instead, a direct key for Total Amount.

e. Special Cases

There can be some handling of special cases to improve extraction precision for some entities. The first example is "PO Box 12345". PO is a shorted form of 'purchase order'. However, it is also the direct key for a Purchase Order (PO) Number. If this special case isn't handled properly, the model may classify 'Box 12345' as a false positive PO Number. Fortunately, the 'PO Box' may be bounded together and 'PO' can be found and replaced with 'postoffice'. It may be of no consequence if 'PO Box' happens to be in two lines since it also breaks the key-value pair.

A second example is related to date entities. In some cases, a date entity also includes the weekday in front of a date, such as 'Monday', 'Mon', 'Tuesday', 'Tues', etc. The weekday text and their shortened forms can be deleted. By doing so, the deletion will pull the key and value closer so that the model can detect them more precisely. In some embodiments, the direct key-value pair occurs in the training data, not the key-weekday-value.

Similar techniques can be applied to other special cases, especially when adding new fields into the extraction list. Similar approaches can be followed to take care of additional special cases while making sure these additional cases do not affect other entities.

f. Backfill Empty Fields

The target fields may not always be found in documents in the training set. Even though a field may be found, it could be empty, further causing the imbalance among the target fields further. Backfilling empty fields can advantageously improve the quality of the training data. Moreover, backfilling empty fields can advantageously make key-value patterns easily detected by the model after training, especially for some less common entities. For example, in some cases, Invoice Number can be found in almost every invoice (which is expected), while a Terms or PO Number might exist only in half of the invoices and most of them could be empty. The imbalance between more common entities and less common entities can be detrimental to the creation of the machine learning model.

How a value is assigned to a field for backfilling may also impact the machine learning model. For example, if values of the same type were backfilled, it would underweight the right key-value patterns. For example, Invoice Number could be a number or a mixture of digits and letters, but with fewer letters. A federal Tax ID can be commonly formatted as '12-3456789'. A PO number could be a number, a multiple-word or even lower case. In some embodiments, it can be advantageous to backfill empty bounding boxes using true values collected from actual documents and then randomly assign them to the right fields.

2. Feature Generation

Selection of informative, discriminating, and/or independent features can be important for training an improved machine learning model. As described herein, a unique approach of feature generation can be used for invoices or other key-value based documents. FIG. 2 depicts an example document image 200.

In FIG. 2, the first text 202 (here '16.28') and the second text 204 (here '16.28') are two values of Total Amount, as classified by the model. The identified first text 202 can be a true positive with a probability of 0.99 and the identified second text 204 can be a false positive with a probability of 0.70.

In some embodiments, created features can be divided into two main groups.

a. Top-K (e.g., K=3) Nearest Neighbors with Distances

The model can treat each n-gram as a possible entity and then evaluate its features' contributions to determine if it is likely the right entity or not. A graph-like data structure can be used to represent an n-gram's neighboring/contextual information in the document. Given an n-gram, the nearest K (e.g., 3) words can be collected along with their distances in eight directions: left, top, right, bottom, top-left, top-right, bottom-left, and bottom-right.

FIG. 3 depicts a visual representation of an example graph-like data structure 300. As shown in FIG. 3, a first uni-gram 302 (here '16.28') (which corresponds to the first text 202 in FIG. 2) is in the center. The left-nearest K (here 3) words are 'amount', 'invoice', and 'total', ordered by their distance to the center. The nearest top-left K (here 3) words are 'freight', 'tax', and 'sales'. As shown, if there were no or less than three neighboring words, they can replaced by a special string 'missing' with a distance of 1.01, to distinguish from 1.0, since the image size can be normalized to [0,1]. The graph-like data structure 300 can represent the contextual information of around the uni-gram 302 (here '16.28') in the document. For example, Total Amount can be determined by its direct three keys: 'total', 'invoice', and 'amount'. But what about the other text in the document (such as the second text 204, "16.28," in FIG. 2)?

In FIG. 2, with respect to the second text 204, the first key on the top can 'total'. Is it also a Total Amount? It is an item total amount in the table and happens to be equal to Total Amount. However, the model may classify both as a Total Amount. However, the model can also return a probability of 0.99 for the first text 202 (here '16.28') and 0.70 for the second text 204 (here '16.28'). Therefore, the first text 202 is more likely to be a Total Amount for this invoice. But why? These two direct keys, 'total' and 'total invoice amount' may not very distinguishable to an associated dollar amount as Total Amount and both of them may occur a lot for the key-value pair of Total Amount. However, the difference in probability, here 0.99 versus 0.70, can be based on a second group of features: the entity's own attributes, which can result in the higher or lower probability observed in entities of the same class.

As described herein, FIG. 3 is a visual representation of a graph-like data structure that can be used in the machine learning. As shown, the example graph-like data structure 300 can represent the nearest K (here 3) neighboring words of an n-gram (a uni-gram 302 of '16.28' in this illustration) in eight directions (left, top, right, bottom, top-left, top-right, bottom-left, and bottom-right). The centric n-gram is a 'possible' entity, determined by its neighboring words. As described herein, a special string "missing' can indicate no word found by n-gram.

b. N-gram's Own Attributes

The neighboring features introduced above, especially direct keys, can be used in classifying if an n-gram is likely the right entity or not. Additionally, the entity's own attributes can also be used by adding their own contributions in the model evaluation and helping distinguish more likely entities from less likely ones. Examples attributes and/or features are provided below.

i. Location, the Center of an n-Gram Bounding Box

The n-gram's location can be indicative for entity identification purposes. For example, in most invoices, Invoice Number and Invoice Date are at the top-right, while dollar amount-related entities are mostly bottom-right. Terms, PO Number, Ship Date, and Order Date are usually at the top half. In the above example described above with respect to FIG. 2, location can at least partially result in the probability of the first text 202 being higher than that of the second text 204 based on the respective locations of the first text 202 and the second text 204.

ii. Style: Letter Case, Upper, Lower or Other

In some embodiments, some documents (such as business documents) can have entities that are typically upper cases, like a company's name, and address, etc. Accordingly, case features can help distinguish entities from non-entities. For example, the model can be trained to distinguish entities with upper case(s) from non-entities with lower case(s).

iii. Type: Alphabets. Digits, or Mixture

Some target classes may not always be numeric. For example, Terms and PO Number may not always be numeric. Accordingly, the type of textual characters can be used by the model to identify likely entities. For example, the type of textual characters can help distinguish the other target entities from Terms and PO Number and from most non-entities with mostly or exclusively alphabet characters.

iv. Regular Expression (Regex), e.g., Money, Date, Number, Tax ID (USA), and/or Tax Rate A regular expression (regex) can be used to identify a entity. Regular expressions can be useful because the regular expression can potentially match multiple textual formats depending on the regular expression definition. A regular expression for particular entities, such as, but not limited to, a money regex, a date regex, a number regex, a tax ID (USA) regex, and/or a tax rate regex, can help distinguish one entity from other entities. For example, a dollar amount regex is usually exclusive to one entity. This can reduce the possibility of classifying dollar entities as others. Using regular expressions can help distinguish entities from non-entities that don't fall in one of regular expressions. However, the regular expressions do not have to catch all types for each entity because a regular expression may advantageously be one of the features used in the model.

v. Priors, the Likelihood of an n-Gram being Present in a Document

In some embodiments, with priors, the model accuracy may go as high as +90%, especially for non-numerical entities (such as an entity that has non-numeral characters), such as PO Number and Terms. For example, the PO Number can be missing in an invoice. In this case, the model may identify either 'Terms' or 'Quantity' as the value for PO Number, although a human being could recognize it as a false positive immediately. Even if the value was not missing, the model still can have a chance to identify 'Terms' as its value if 'PO' and 'Terms' are neighboring ('number' may be deleted already based on the processing techniques described herein) and horizontally aligned. But how can the system or method effectively distinguish the false-positive neighbors? The solution can be based on statistical concept (s). In key-value pairs, keys are the most frequent items, while values are less frequent items. As used herein, priors can be defined as a probability of an n-gram being identified in documents. The dictionary with regular document words and shorted forms, described above for spell check, can be used here.

In some embodiments, priors can be used as a filter rather than a feature in a model because of the possible imbalance between the frequency of entities and non-entities in documents. For example, an n-gram with digits or punctuations can have a prior of 0.0, while a most frequent keyword, like 'invoice', can be capped at 1.0. In some embodiments, priors can advantageously be used as a filter. First, applying a threshold value, such as 0.05 (above that there may be little to no chance to be one of target entities), to priors may remove a percentage (such as approximately ~20% in some case) of non-entities immediately, which can advantageously reduce the computation demand of entity identification. Second, priors can reduce false positives, especially for entities with non-numerical values, such as PO Number and Terms. Priors can be especially useful when a field has no value. For example, without using priors, it may be difficult for a model to classify either the right or bottom n-gram as a value of the key, which was very likely a key of another entity.

Figure 4:
FIG. 4 illustrates a portion of another example document, according to some embodiments of the present disclosure.

In FIG. 4, a portion of a document 400 is shown. In the example portion of the document 400, PO Number can be empty. The first entity value 402 (here the highlighted Terms value) and the second entity value 404 (here the highlighted Ship Date value) can be identified by the model. The numerical values, 1.0 and 0.99, as annotated in FIG. 4, can be the probability of each entity, respectively, returned by a model in accordance with some embodiments.

FIG. 4 shows a case of an empty PO Number, in which 'Terms' or 'Quantity' could be a false positive of PO Number. Since 'Terms' and 'Quantity' can have large priors (e.g., greater than 0.05), 'Terms' and 'Quantity' can be filtered out during the prediction and, therefore, have little to no probability as being identified as false positive of a PO Number. Therefore, in some embodiments, applying priors can increase the final extraction accuracy of any entity allowing regular words as its value (such as words with non-numerical characters), such as PO Number, Terms, etc.

vi. Number of Characters

A number-of-characters feature can help distinguish entities among the target classes. For example, dollar amounts typically have fewer characters than other entities. A date usually has a minimum of 4 to 9 characters ('1-1-19' or 'Jan-01-2019'). The Terms entity occasionally has a short word, e.g., 'Net10', while it can have a long word combination other times, such as 'Due Upon Receipt' or 'Net 15 days from the invoice date.' The number-of-characters feature can be very helpful for Tax ID. In most countries, Tax ID has a fixed length of characters. For example, the USA federal tax ID is 9 digits, after removing the hyphen or dot.

vii. Punctuations, e.g., Number of Unique Punctuations

A punctuations feature, such as a number-of-unique-punctuations feature, can help distinguish entities from non-entities, especially fuzzy strings, barcodes, OCR errors, etc. In some embodiments, it was observed that most of the entities have either 0 or 1 types of unique punctuation characters, such as the dash character in '12-31-2019', '123-ABC', etc.

viii. Additional Features

In some embodiments, additional features can be considered. For example, during a feature selection step, non-significant features can be removed based on statistical testing. In some embodiments, a combination of the above features can be significant and unique. In some embodiments, removing one of them may cause a decrease in model performance. An encoding can be applied on the categorical features, such as neighboring words in eight directions which contribute the most in the final features. A threshold (such as 30) for the minimum counts of a neighboring word can be chosen to cut off all non-significant neighboring words. In some embodiments, approximately 1,000 features can be included in the final training dataset. Accordingly, using the improved models described herein, classifying an entity may not rely on only a few features like special orientation, distance, or regular expression, which are heavily used in some existing rule-based extraction implementations. Given an n-gram to be identified, some of the features could be positive, some of them could be negative, and some of them could be zero or negligible. But the final identification can be based on the overall evaluation of all features' contributions. The impact of each selected feature can be determined, as described below.

III. Model Training

Model training is a machine learning process that can use training samples data to find out the impact of each feature on associated classes. The machine learning process can use gradient boosted decision trees. For example, XGBoost (eXtreme Gradient Boosting) can be used since it is an implementation of gradient boosted decision trees designed for speed and performance. XGBoost can be a preferred classification algorithm for structured or tabular datasets, especially for high-dimension data, such as where there are, for example, approximately 1,000 features or columns. There can be a total of approximately 14 classes, including the 0 (negative, non-entity or other) class. The 1-13 (positive) classes can correspond Invoice Number, PO Number, Invoice Date, Due Date, Ship Date, Order Date, Terms, Tax ID, Subtotal, Tax Amount, Tax Rate, Total Amount, Amount Due, respectively.

TABLE 1

Overview of modeling data among 14 example classes

| Class | Training Count | Training Ratio | Holdout Count | Holdout Ratio |
|---|---|---|---|---|
| Non-Entities | 911966 | 97.45% | 151871 | 97.43% |
| Invoice Number | 3928 | 0.42% | 757 | 0.49% |
| Invoice Date | 3694 | 0.39% | 553 | 0.35% |
| Due Date | 1366 | 0.15% | 253 | 0.16% |
| Order Date | 535 | 0.06% | 64 | 0.04% |
| Ship Date | 672 | 0.07% | 36 | 0.02% |
| PO Number | 2437 | 0.26% | 283 | 0.18% |
| Terms | 2296 | 0.25% | 337 | 0.22% |
| Tax Id | 466 | 0.05% | 231 | 0.15% |
| Subtotal | 1816 | 0.19% | 280 | 0.18% |
| Tax Rate | 507 | 0.05% | 104 | 0.07% |
| Tax Amount | 2033 | 0.22% | 241 | 0.15% |
| Total Amount | 2033 | 0.22% | 521 | 0.33% |
| Amount Due | 2124 | 0.23% | 348 | 0.22% |
| Total | 935873 | 100.00% | 155879 | 100.00% |

In some examples, given the fact that 1-13 classes are much less than the 0 class, both training and holdover datasets can be heavily skewed towards 0, as shown in Table 1, and about ~97.5% data can correspond to the non-entity. Thus, using the accuracy of all classes in the model may not be the most informative metric, as a good classification on the dominant class (0) would result in a high accuracy irrespective of the performance of minority classes (e.g., 1-13). Secondly, the 0 class is not an interesting one from a model training perspective. Therefore, Precision, Recall and the corresponding F1 scores can be calculated for the positive classes (e.g., 1-13), after excluding the 0 class. As used herein, the F1 score is the harmonic mean of Precision and Recall, which allows the combination of Precision and Recall into one metric, as defined below.

$$Recall = \frac{True\ Positives}{True\ Positives + False\ Negatives}$$

$$Precision = \frac{True\ Positives}{True\ Positives + False\ Positives}$$

$$F1 = \frac{2 * Recall * Precision}{Recall + Precision}$$

Each of the positive classes can have the above three scores, Recall, Precision, and F1. For example, there can be a total of 13 positive classes and each one can have three scores. However, exclusively using the original three metrics may not be convenient and/or informative. Weighted-average metric can be introduced, as defined below. In the below equation, in can be 13 for 13 classes.

$$Weighted\ Average\ Metric = \frac{\sum_{i=1}^{n}(Metric_i * Support_i)}{\sum_{i=1}^{n} Support_i}$$

In the above equation, the Metric can be one of Recall, Precision, and F1 scores and Support can be the total number in each entity. As used herein, the Recall, Precision, or F1 scores can refer to its corresponding weighted-average metric.

However, there can be a very challenging problem where there can be extremely imbalanced data between the negative (0) class and positive (e.g., 1-13) classes, as well as extremely imbalanced data among positive classes, too. If training a model using all data of the negative (0) class and all or much of positive (e.g., 1-13) classes, the model may be in favor of the 0 class and fewer of them would be misclassified as one of positive (e.g., 1-13) classes. Therefore, during prediction, the precision of positive (e.g., 1-13) classes may be relatively high, while recalls may be low. On the other hand, using fewer data of the negative (0) class and all or much of the positive (e.g., 1-13) classes, the model may be in greater favor of positive (e.g., 1-13) classes. In this case, more data of the negative (0) class would be misclassified as one of positive (e.g., 1-13) classes. It can result in very bad precision and relatively high recalls among positive (e.g., 1-13) classes. Conversely, the recall of the negative (0) class can be expected to drop while its precision may have a negligible increase. In some examples, ~97.5% data can be non-entities, and a 1.0% drop in recall of the negative (0) class may cause almost ~1% false positives overall, distributed among positive (e.g., 1-13) classes, which can be comparable to the number of all positive classes (~2.5%) in the modeling data.

IV. Two-Step Extraction Approach

Step 1: Tradeoff Between Recall and Precision

Precision and Recall can be important model evaluation metrics. In the present context, Precision refers to the percentage of true classes among the identified classes, and Recall refers to the percentage of total true classes correctly classified by the model. Unfortunately, it may not be possible to maximize both metrics at the same time, as one comes at the cost of the other. Since the goal is to classify the positive (e.g., 1-13) classes, an overall high recall in positive (e.g., 1-13) classes is much more important, even though it results in lower precision, which can result in a high false-positive rate. Therefore, a trade-off can be encountered, and a decision may be made whether to maximize Precision or Recall and by how much.

Figure 5A:
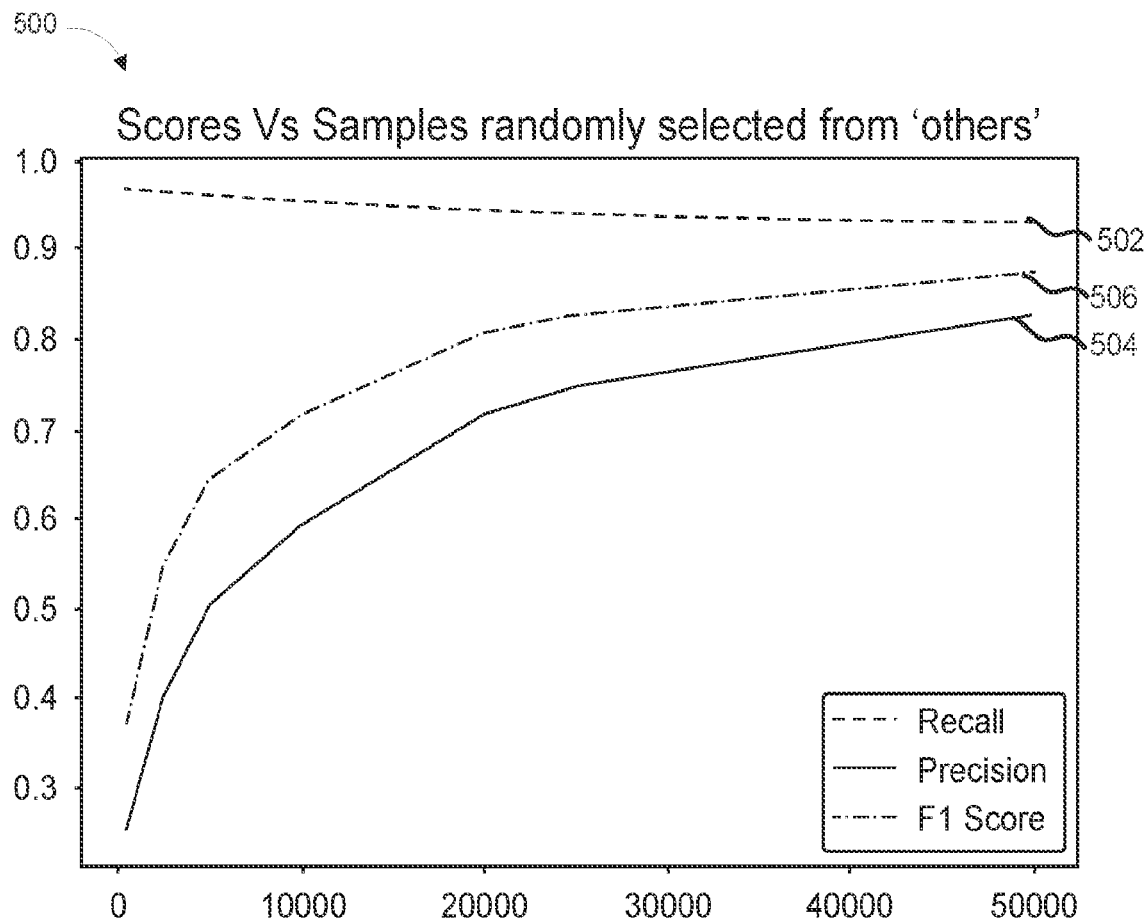
FIG. 5A illustrates a graph from example experimental testing showing Recall and Precision, according to some embodiments of the present disclosure.

FIG. 5A depicts a graph 500 of the results of an experiment of a trade off between Recall and Precision. In the graph 500, Recall 502, Precision, 504, and an F1 score 506 are shown. If a model was trained on only randomly selected 500 non-entities mixed with all positive classes, the prediction in the holdout dataset shows a very high weighted-average Recall, +96%, but a very low weighted-average Precision, 25%. As the number of non-entities in the model are increased, the Recall slightly decreases, while the Precision significantly increases, 94% in Recall and 80% in Precision as 50,000 non-entities are added. Having a relatively high Precision while the Recall slightly drops can make the next step of post-extraction much easier because it may dramatically remove the non-sense classified entities.

In the example experiment of FIG. 5A, a series of models can be trained on a series of a randomly selected number of non-entities (the x-axis) plus all true entities (e.g., approximately 24,000) and predict all data in the holdout dataset. Each of the plots in the graph 500 can be scores (such as Recall, Precision, or F1 score) for the holdout data, instead of the training data or other data.

FIG. 5B-5C can illustrate a confusion matrices of prediction on the holdout data under different models. In particular, the tables 520, 540 of FIGS. 5B, 5C, respectively, can show a comparison of the model performance on the holdout data under the model trained on two different scenarios, 5000 non-entities, and 25000 non-entities, respectively. In FIG. 5B, the first table 520 can be a confusion matrix of prediction on the holdout data under a model trained on 5000 non-entities and all true entities (23907). In FIG. 5C, the second table 540 can be a confusion matrix of prediction on the holdout data under a model trained on 25000 non-entities and all true entities (23907).

The first row in each "confusion" table can be compared. Compared to the second table 540 of FIG. 5C trained on 25000 non-entities, the first table 520 of FIG. 5B trained on 5000 non-entities shows more non-entities (0) distributed to each of the positive 1-13 classes, which are false positives. For example, the Invoice Number has false positives of 988, larger than that of true positives of 745. The Terms was even worse, 865 vs 326. In some embodiments, a Terms value may not always be seen in a document and empty may be seen most of the time. In this situation, if a false positive was classified, it would very likely survive down to the final extraction. However, on the other hand, more non-entities were added into the model, the non-entity may have a higher chance to be classified correctly. Consequently, fewer non-entities would be classified as positive 1-13 classes. This is the reason why the tradeoff between Precision and Recall may be important.

The below Table 2 shows an example final model, which was trained on 15000 non-entities and all entities from positive 1-13 classes and then tested on the holdout dataset. This also represents the entity-wise model performance on actual documents. The 0 class was excluded from the table since it is not an interesting entity, which can be a strategy to be applied in other entity-recognition models in order to give a fair evaluation of model performance on positive classes. Otherwise, the weighted average scores can be much higher since ~97% of data belongs to the 0 class, which could be misleading about the model performance. In the example, choosing 15000 non-entities was a tradeoff between Recall and Precision, where Recall slightly dropped to 94%, Precision jumped to 65% and F1 score is 76%. Precision and F1 scores in the current stage may be improved further. Therefore, in some embodiments, the next step, called post-extraction, can advantageously improve the final scores.

TABLE 2

Summary of the model (15000 non-entities + 23907 true entities) prediction scoreson the holdout data, Recall, Precision and F1 Scores

| Field | Recall | Precision | F1 Score | Support |
|---|---|---|---|---|
| Invoice No | 0.9775 | 0.6935 | 0.8114 | 757 |
| PO No | 0.9152 | 0.557 | 0.6925 | 283 |
| Invoice Date | 0.9819 | 0.5814 | 0.7303 | 553 |
| Due Date | 0.9565 | 0.8674 | 0.9098 | 253 |
| Order Date | 0.9062 | 0.9355 | 0.9206 | 64 |
| Ship Date | 0.9444 | 0.3009 | 0.4564 | 36 |
| Terms | 0.9555 | 0.5887 | 0.7285 | 337 |
| Subtotal | 0.7429 | 0.6172 | 0.6742 | 280 |
| Tax Rate | 0.9135 | 0.8962 | 0.9048 | 104 |
| Tax Amount | 0.9378 | 0.3729 | 0.5336 | 241 |
| Total Amount | 0.9846 | 0.3955 | 0.5644 | 521 |
| Amount Due | 0.9023 | 0.822 | 0.8603 | 348 |
| Tax Id | 0.9481 | 0.8423 | 0.8921 | 231 |
| Weighted avg | 0.9401 | 0.6518 | 0.7555 | 4008 |

Step 2: Post Extraction

In some embodiments, a model may still have a significant amount of false positives among the positive (e.g., 1-13) classes. For example, Precision of 65% indicates the real accuracy for the positive (e.g., 1-13) classes could be much lower. In order to improve the final extraction accuracy, a unique post-extraction approach can be used. The post-extraction approach can use rule(s), working as filters, reducing false positives step by step and eventually improving the final extraction accuracy. Five example rules are described below.

1. Assume Each Individual Entity to be Unique

For example, some entities can be assumed to be unique. For example, Invoice Number can be unique. However, other entities, such as PO numbers, could co-exist in a single document. In some cases, duplicate entities can exist.

2. Predicting a single document only

The model can be allowed to only accept an input of a single document instance, not a document split among multiple files. Otherwise, it may violate the above assumption regarding uniqueness. Accordingly, a single document instance can be treated as being unique, e.g., an invoice split among multiple files may not be permitted.

3. Choosing Thresholds to Remove False Positives

False positives from the model prediction may still survive even after picking up a unique value for each entity. A key associated with an entity could appear in many places in the document, like 'invoice', 'date'. It may be even worse if the field happens to be empty. Moreover, a key is not only a factor to determine its nearest n-gram to be the likely right entity or not. Other features, such as location, regex, or style might contribute positively. The good thing is that the model returns a probability for each entity, no matter a false positive or true positive. Usually, the probability of false positives is smaller than that of a true positive.

Figure 6:
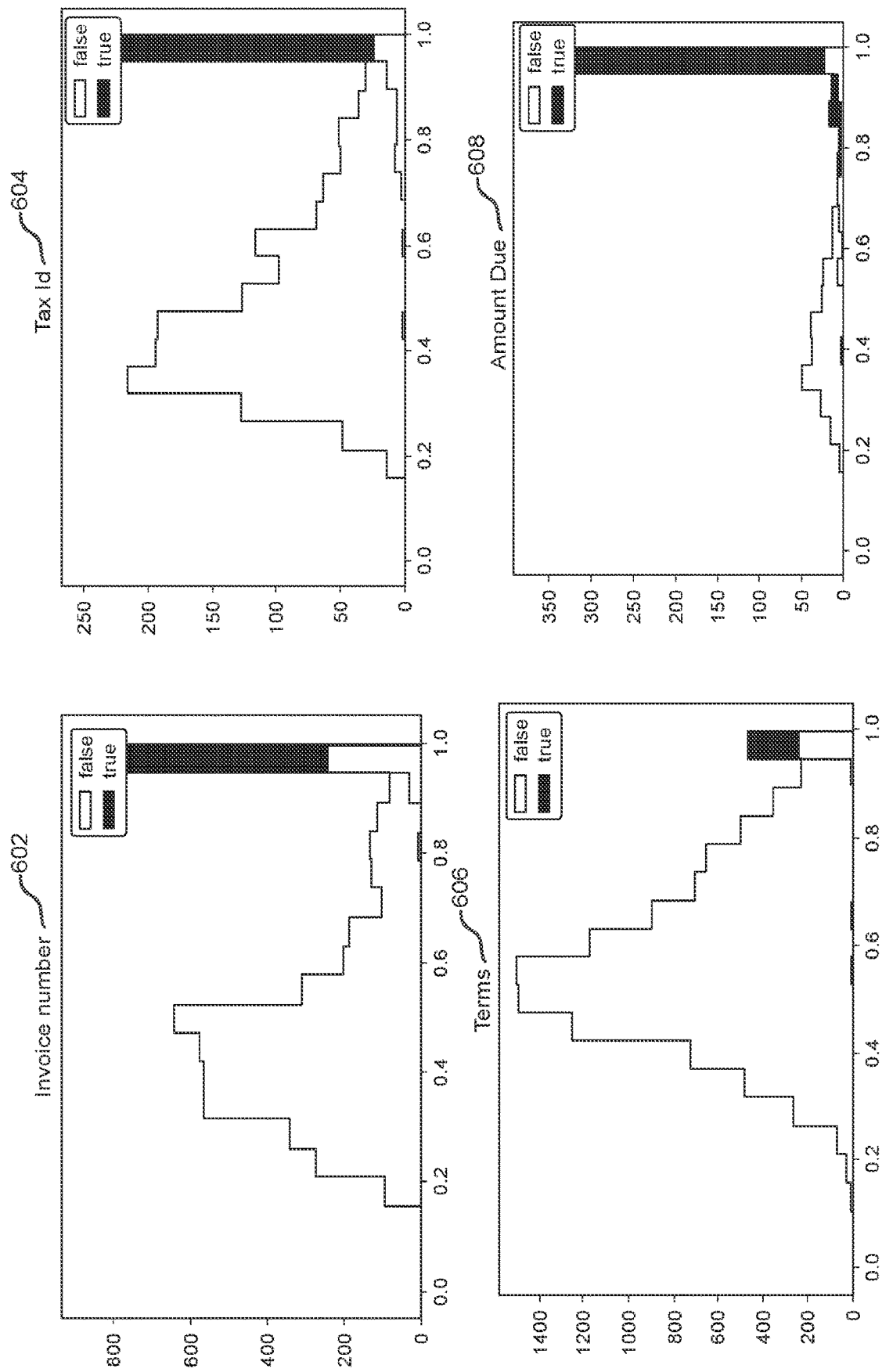
FIG. 6 illustrates histogram graphs of example probabilities of true and false positives for example entities, according to some embodiments of the present disclosure.

FIG. 6 illustrates histogram graphs 602, 604, 606, 608 of example probabilities of true and false positives for example entities. The histogram graphs 602, 604, 606, 608 show the probabilities for four entities, Invoice Number, Tax ID, Terms, Amount Due, respectively, grouped by true positive and false positive. Probabilities of true positive are most distributed nearby 1.0, while probabilities of false-positive are most clustered around 0.4-0.6. Therefore, choosing a threshold at 0.5-0.6 may dramatically reduce false positives. For some entities, such as Invoice Number, an even higher threshold of 0.8 could be chosen. In some embodiments, the threshold could be further tuned to maximize performance. Thus, one filter rule can correspond to a threshold level for entity probabilities.

4. Choosing an Entity with a Highest Probability for Each Class

In some cases, even with selection of optimal and/or semi-optimal thresholds, there may still be a significant amount of false positives remaining. There may still be a few false positives with relatively high probabilities overlapped with true positives as shown in FIG. 6. Accordingly, an additional filter can be applied. Namely, selecting an entity with a highest probability for each class. An entity with a larger probability indicates that the feature space is more favorable to it than others in the same class. This can be a double assurance of uniqueness of extracted entities.

5. Applying Different Priorities for the Extraction of Uni-Grams and Multi-Grams The above Rule 4 can be further assurance regarding entity uniqueness. It can work well, especially for uni-gram entities. As for multi-gram entities, there may still be an issue due to the n-gram creation. If the key and value in a pair are close to each other horizontally and both are n-grams, they may not be parsed individually from the OCR file. It may also be very difficult to choose a minimum distance to cluster n-grams of the key and n-grams of the value. Creating a series of n-grams out of a pair could separate the key and value very well. But it can also result in a problem with multiple candidates for the key. Simply choosing one with the highest probability would only get a partial value of a full entity. The below Table 3 shows multiple n-gram candidates of terms in a key-value pair of 'Payment Terms: Net 30 Days from Invoice Date' from a document. In the example, the OCR didn't separate the key and value even though a white space between 'Terms:' and 'Net' is twice the others in this example LINE item. The creation of n-grams successfully separates the key of 'Payment Terms' out, creating 4 candidates with decent probability each at the same time. The last one 'Net 30 Days from Invoice Date' was the exact value, which was excluded due to the maximum of 5-gram. If creating 6- or even 7-grams, then 'Net 30 Days from Invoice Date' could be used, but it may have a smaller probability from the table. While choosing '30 Days' because of its largest probability might be an acceptable answer, the 'Net 30 Days from Invoice' seems to be a better one with more information. It can be assumed that a full set of n-grams has a higher priority than its subsets to be the right entity value. In some embodiments, this can also be derived from the observation that in some document sets most of the key-value pair are isolated horizontally. However, for money related entities, the opposite may work better since the dollar amounts may most likely to be a uni-gram. If 'USD 99.99' and '99.99' were classified as a total amount, choosing the "99.99' seems to be a likely correct answer. Therefore, any money related entities, Tax rate, Tax amount, etc., can keep the smaller subsets, while the others, can keep fuller sets. This can result in improved entity extraction accuracy.

TABLE 3

| N-gram candidates of terms in a key-value pair of 'Payment Terms: 30 days from Invoice Date' | |
|---|---|
| Candidate | Probability |
| 30 Days | 0.9974 |
| 30 days from | 0.9732 |
| 30 Days from Invoice | 0.9098 |
| 30 Days from Invoice Date | N/A |

After applying some or all of the rules, the accuracy level of the extraction can be reviewed. The below Table 4 shows a summary of the post-extraction scores on the holdout dataset (500 invoices) with a trade-off model in Table 4. First, a trade-off between Recall and Precision was already made in this table. Randomly selected 15000 non-entities (0 class) and all 23907 positive entities (1-13 classes, seen in Table 1) were trained using the example XGBoost algorithm. After that, the model was applied to all data in the holdout dataset, including non-entities and positive entities. The model prediction is shown at the top. In some examples, before applying the approach of post-extraction, the weighted Recall was 94.01%, Precision was 65.18%, and F1 Score was 75.55%. After the post-extraction, Recall slightly increased to 95.48%, while Precision had a very solid increase to 91.22% from the previous 65.18% and similarly F1 Score jumps to 93.11%. In the example, the 'Final Amount' is a combination of 'Total Amount' and 'Amount Due,' which is equal to 'Amount Due' if it is identified by the model or 'Total Amount' if the 'Amount Due' is not detected. An invoice has a 'Total Amount,' 'Amount Due,' or both. But they may not always be equal. Therefore, using the combined amount as the 'Final Amount' of an invoice may be more reasonable. After this combination, the final model scores are Recall 95.81%, Precision 93.94%, and F1

Score 94.75%. The slight gain comes from the fact that Precision of Total Amount is worse than that of 'Amount Due,' 77.39% vs. 94.09%. This is why a 'Final Amount' may be considered as a combination of 'Total Amount' and 'Amount Due.'

TABLE 4

Summary of final extraction performance on example holdout data, Recall, Precision, and F1 Score

| Field | Recall | Precision | FI Score | Support |
|---|---|---|---|---|
| Invoice No | 0.9876 | 0.9815 | 0.9845 | 483 |
| Invoice Date | 0.9835 | 0.9755 | 0.9795 | 486 |
| Due Date | 0.9603 | 0.9652 | 0.9627 | 202 |
| Order Date | 0.9706 | 1.0000 | 0.9851 | 34 |
| Ship Date | 0.9437 | 1.0000 | 0.9710 | 71 |
| PO No | 0.9286 | 0.6933 | 0.7939 | 112 |
| Terms | 0.9598 | 0.8539 | 0.9038 | 274 |
| Tax Id | 0.9161 | 0.9704 | 0.9425 | 143 |
| Subtotal | 0.8874 | 0.9447 | 0.9152 | 231 |
| Tax Rate | 0.9670 | 0.8800 | 0.9215 | 91 |
| Tax Amount | 0.9133 | 0.8647 | 0.8883 | 196 |
| Total Amount | 0.9467 | 0.7739 | 0.8516 | 394 |
| Amount Due | 0.9637 | 0.9409 | 0.9522 | 248 |
| Final Amount* | 0.9717 | 0.9717 | 0.9717 | 495 |
| Weighted Avg | 0.9548 | 0.9122 | 0.9311 | 2965 |
| Weighted Avg* | 0.9581 | 0.9394 | 0.9475 | 2818 |

Accordingly, the techniques described herein can be used to improve field extraction of documents with key-values. The machine-learning-based key-value extraction approaches can be technical improvements over exclusively rule-based approaches. In some experimental testing, an accuracy level of +94.5% was achieved with a minimal number (~4000) documents while some classes, such as Order Date, Due Date, Tax Id, and Tax Rate had small proportions in the training dataset. Having a larger training set, especially adding more small proportions entities could boost the accuracy of the training models, as described herein.

V. Example Process

Figure 7:
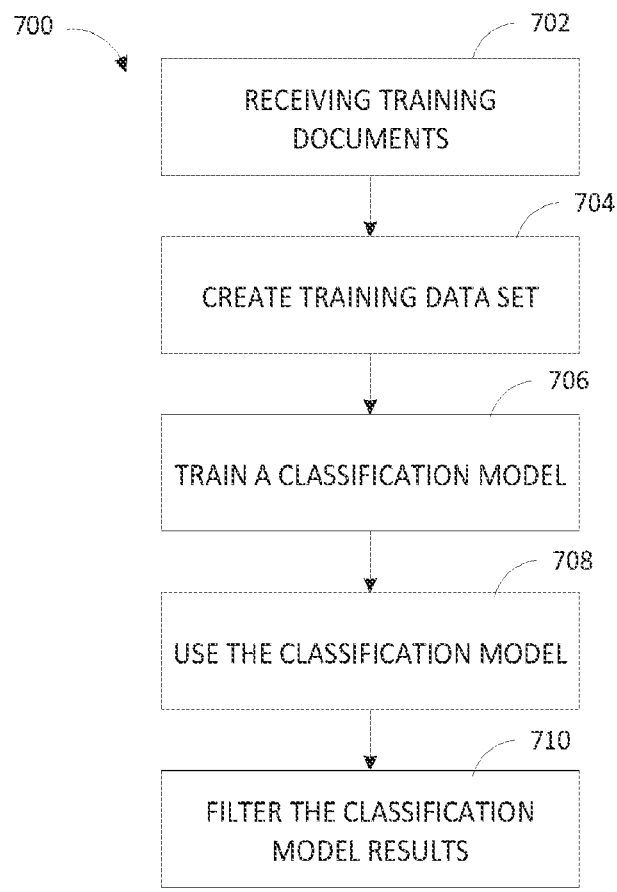
FIG. 7 is a flowchart of an example method of preparing data, feature engineering, model training, and data extraction, according to some embodiments of the present disclosure.

FIG. 7 is a flowchart of an example method 700 of generating user interfaces, according to some embodiments of the present disclosure. Although the method 700 is described in conjunction with the systems of FIG. 8, any system configured to perform the method, in any order, is within the scope of this disclosure. The method 700 may be performed by the various components of the computing system 800 of FIG. 8 as discussed herein. Depending on the embodiment, the method 700 may include fewer or additional blocks and/or the blocks may be performed in an order different than is illustrated. Other embodiments of the method 700 may include less blocks than illustrated or the blocks may be performed in a different order than as illustrated.

Beginning at block 702, training documents can be received. In particular, the system 800 can receive the training documents. As described herein, example training documents can include, but are not limited to, invoices, purchase orders, packing slip, bills of lading, and contracts. The training documents can be in an image format, such as a JPEG format.

At block 704, a training data set can be created. In particular, the system 800 can create a training data set from the training documents. As an initial step, the system 800 can be processed through OCR. Example output of the OCR can be a list of words (uni-grams) and their coordinates can be extracted from the original images. As described herein, the output can be multiple document objects per document image. The OCR output can include BlockType objects, such as WORD and LINE objects, as described herein.

In some embodiments, the system 800 can further process the training data set. Example additional processing is described above with respect to Sections I and II. For example, a response variable can be prepared with labeled entities. Moreover, as described above, additional processing of the training data set can include word cleaning, checking spelling and/or correcting the OCR output, creating n-grams, manipulating data, applying special cases, and/or backfilling empty fields.

At block 706, a classification model can be trained. In particular, the system 800 can train a classification model. The system 800 can train the classification model by applying features to the training data set. Example features can include a first feature corresponding to a location of an n-gram, a second feature corresponding to letter case, a third feature corresponding to textual character type, a fourth feature corresponding to a regular expression, a fifth feature corresponding to a number of characters, and/or a sixth feature corresponding to punctuation. Features and feature generation are discussed in further detail above with respect to Section II, such as using a top-k nearest neighbors with distances, using an n-gram's own attributes, using location, letter case, textual character type, regular expressions, number of characters, and/or punctuation.

The first feature can corresponding to the location of the n-gram can use a graph-like data structure, which is described above in further detail with respect to FIG. 3. The graph-like data structure can indicate the nearest words neighboring the location of the n-gram. The second feature corresponding to letter case can indicate numerical and non-numerical character types.

The system 800 can train a classification model using the training data set with the features described herein. The system 800 can use a machine learning process such as gradient boosted decision trees. An example gradient boosted decision trees implementation is XGBoost. Additional details regarding the training of the classification is described above in Section III.

At block 708, the classification model can be used. In particular, the system 800 can use the classification model to classify input documents. The system 800 can apply optical character recognition to an input document image, which outputs document objects. The system 800 can apply the classification model to the document objects. The system 800 applying the classification model can include outputting entities and non-entities with corresponding probabilities indicating a likelihood of correctness for each entity and non-entity.

In some embodiments, after the classification model is trained, the system 800 can apply filtering to an input document image. For example, as described above, priors can be used for filtering. The system 800 can apply threshold values to priors of the document objects of the input document image. The system 800 can determine, from the initial document objects, a subset of document objects based at least in part on some of the priors of the plurality of document objects not satisfying the threshold values. The system 800 can applying the classification model to the subset of document objects.

At block 710, the classification model results can be filtered. In particular, the system 800 can improve, post-extraction, classification accuracy of key-values after the machine-learning model has been applied to documents. For example, the system 800 can receive a collection of document images (or a single document image); create an input data set from the collection (or the single document image), such as through OCR; and apply the classification model to the input data set that generates an initial set of entity predictions. The system 800 can filter the initial set of entity predictions that generates a revised set of entity predictions. The system 800 filtering the initial set of entity predictions can include applying rules to the initial set of entity predictions. Example rules can include a first rule corresponding to treating each individual entity as unique, a second rule corresponding to treating a single document as unique, a third rule corresponding to a threshold level for entity probabilities, a fourth rule corresponding to selection of an entity with a highest probability for each class, and a fifth rule corresponding to prioritizing entity selection of a largest multi-gram from a plurality of multi-gram candidates. Additional details regarding the post-extraction rules are described above in Section IV.

In some embodiments, the system 800 can create the input data set from the collection or the single document image. The system can apply optical character recognition to one or more documents image that outputs the document objects. The input data set to the classification model can include the document objects. As described herein, an example document object can a line object with multiple unigrams on a same line with a distance between adjacent unigrams less than a value.

Example Computing System

Figure 8:
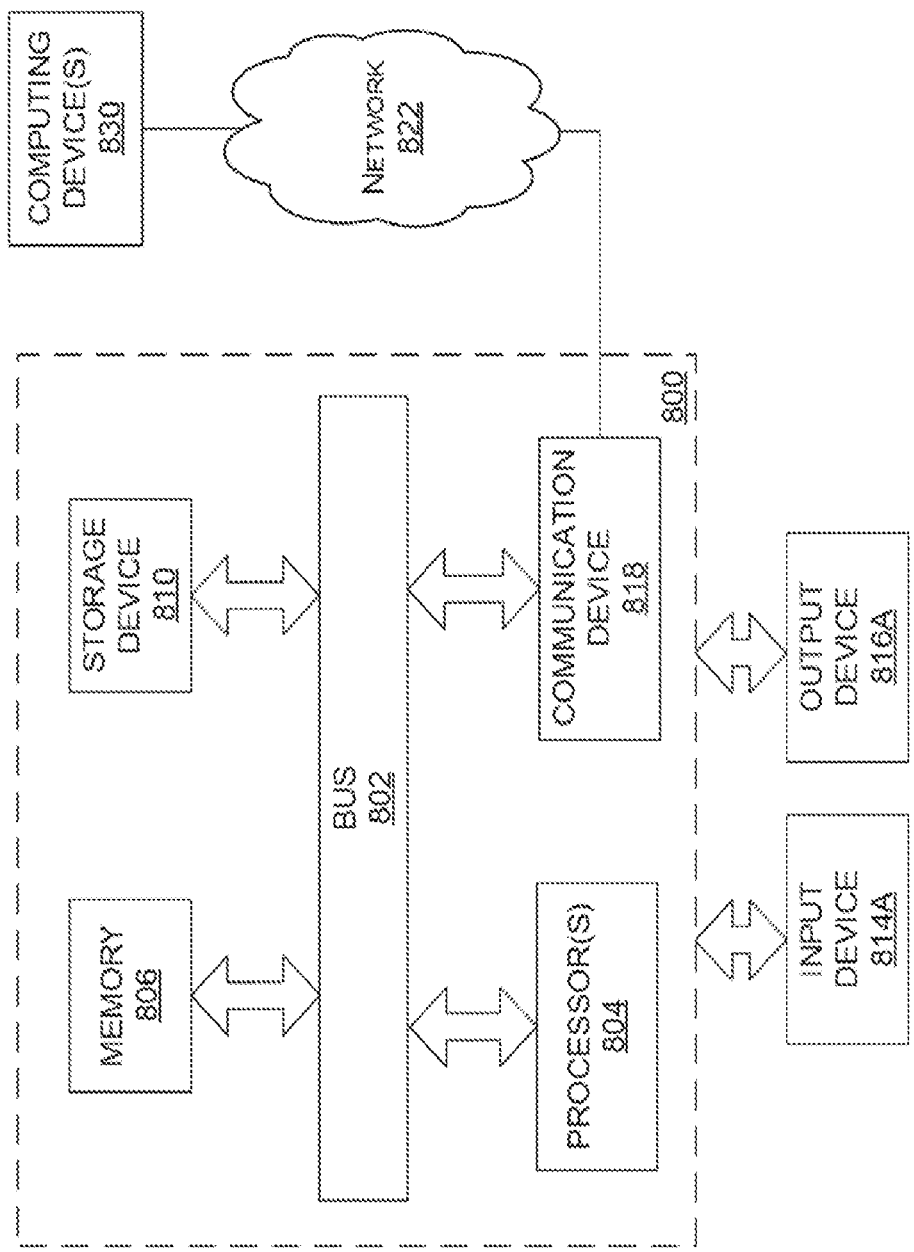
FIG. 8 illustrates an example computing system with which some embodiments of the present disclosure may be implemented.

FIG. 8 depicts a general architecture of a computing system 800. The computing system 800 or components of the computing system 800 may be implemented by any of the devices or components discussed herein. The general architecture of the computing system 800 depicted in FIG. 8 includes an arrangement of computer hardware and software components that may be used to implement aspects of the present disclosure. The computing system 800 may include many more (or fewer) elements than those shown in FIG. 8. It is not necessary, however, that all of these elements be shown in order to provide an enabling disclosure. As illustrated, the computing system 800 includes one or more hardware processors 804, a communication interface 818, a computer readable medium storage device 810, one or more input devices 814A (such as a touch screen, mouse, keyboard, etc.), one or more output devices 816A (such as a monitor, screen, or display), and memory 806, some of which may communicate with one another by way of a communication bus 802 or otherwise. The communication interface 818 may provide connectivity to one or more networks or computing systems. The hardware processor(s) 804 may thus receive information and instructions from other computing systems or services via the network 822.

The memory 806 may contain computer program instructions (grouped as modules or components in some embodiments) that the hardware processor(s) 804 executes in order to implement one or more embodiments. The memory 806 generally includes RAM, ROM or other persistent, auxiliary or non-transitory computer readable media. The memory 806 may store an operating system that provides computer program instructions for use by the hardware processor(s) 804 in the general administration and operation of the computing system 800. The memory 806 may further include computer program instructions and other information for implementing aspects of the present disclosure. In addition, memory 806 may include or communicate with the storage device 810. A storage device 810, such as a magnetic disk, optical disk, or USB thumb drive (Flash drive), etc., is provided and coupled to the bus 802 for storing information, data, or instructions.

The memory 806 may also be used for storing temporary variables or other intermediate information during execution of instructions to be executed by hardware processor(s) 804. Such instructions, when stored in storage media accessible to hardware processor(s) 804, render the computing system 800 into a special-purpose machine that is customized to perform the operations specified in the instructions.

In general, the word "instructions," as used herein, refers to logic embodied in hardware or firmware, or to a collection of software modules, possibly having entry and exit points, written in a programming language, such as, but not limited to, Java®, Scala, Lua, C, C++, or C #. A software module may be compiled and linked into an executable program, installed in a dynamic link library, or may be written in an interpreted programming language such as, but not limited to, BASIC, Perl, or Python. It will be appreciated that software modules may be callable from other modules or from themselves, or may be invoked in response to detected events or interrupts. Software modules configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules or computing device functionality described herein are preferably implemented as software modules, but may be represented in hardware or firmware. Generally, the instructions described herein refer to logical modules that may be combined with other modules or divided into sub-modules despite their physical organization or storage.

The term "non-transitory media," and similar terms, as used herein refers to any media that store data or instructions that cause a machine to operate in a specific fashion. Such non-transitory media may comprise non-volatile media or volatile media. Non-volatile media includes, for example, optical or magnetic disks, such as the storage device 810. Volatile media includes dynamic memory, such as the main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus 802. Transmission media can also take the form of acoustic or light waves, such as those generated during radio-wave and infrared data communications.

The computing system 800 also includes a communication interface 818 coupled to the bus 802. The communication interface 818 provides a two-way data communication to the network 822. For example, communication interface sends and receives electrical, electromagnetic, or optical signals that carry digital data streams representing various types of information via cellular, packet radio, GSM, GPRS, CDMA, WiFi, satellite, radio, RF, radio modems, ZigBee, XBee, XRF, XTend, Bluetooth® D, WPAN, line of sight, satellite relay, or any other wireless data link.

The computing system 800 can send messages and receive data, including program code, through the network 822 and the communication interface 818. A computing system 800 may communicate with other computing devices 830 via the network 822.

The computing system 800 may include or be implemented in a distributed computing environment including several computer systems that are interconnected using one or more computer networks. The computing system 800 could also operate within a computing environment having a fewer or greater number of devices than are illustrated in FIG. 8.

ADDITIONAL EMBODIMENTS AND TERMS

The various functionality described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA, other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A method to train a machine-learning model to extract key-values from documents, the method comprising:
    receiving a collection of training document images;
    creating a training data set from the collection; and
    training a classification model using the training data set, wherein training the classification model further comprises applying at least a plurality of features to the training data set, the plurality of features comprising:

a first feature corresponding to a location of an n-gram,
a second feature corresponding to a plurality of letter cases,
a third feature corresponding to textual character type,
a fourth feature corresponding to a regular expression,
a fifth feature corresponding to a number of characters used to distinguish between different entities among target classes, and
a sixth feature corresponding to punctuation.

2. The method of claim 1, wherein the first feature corresponding to the location of the n-gram uses a graph-like data structure.

3. The method of claim 2, wherein the graph-like data structure indicates the nearest words neighboring the location of the n-gram.

4. The method as in one of claims 1-3, wherein the second feature corresponding to letter case indicates numerical and non-numerical character types, wherein the plurality of letter cases includes upper case(s) and lower case(s).

5. The method of claim 1, further comprising:
applying optical character recognition to a document image, wherein applying optical character recognition outputs a plurality of document objects;
applying threshold values to priors of the plurality of document objects;
determining, from the plurality of document objects, a subset of document objects based at least in part on some of the priors of the plurality of document objects not satisfying the threshold values; and
applying the trained classification model to the subset of document objects.

6. The method of claim 1, further comprising:
applying optical character recognition to a document image, wherein applying optical character recognition outputs a plurality of document objects; and
applying the trained classification model to the plurality of document objects, wherein applying the trained classification model further comprises:
outputting entities and non-entities with corresponding probabilities indicating a likelihood of correctness for each entity and non-entity.

7. The method of claim 1, wherein the sixth feature corresponding to punctuation is based on a unique punctuation characters that are observable within an entity.

8. A system comprising:
a data store configured to store computer-executable instructions; and
a hardware processor in communication with the data store, the hardware processor, when executing the computer-executable instructions, configured to:
receive a collection of training document images;
create a training data set from the collection; and
train a classification model using the training data set, wherein training the classification model further comprises applying at least a plurality of features to the training data set, the plurality of features comprising:
a first feature corresponding to a location of an n-gram,
a second feature corresponding to a plurality of letter cases,
a third feature corresponding to textual character type,
a fourth feature corresponding to a regular expression,
a fifth feature corresponding to a number of characters used to distinguish between different entities among target classes, and
a sixth feature corresponding to punctuation.

9. The system of claim 8, wherein the first feature corresponding to the location of the n-gram uses a graph-like data structure.

10. The system of claim 9, wherein the graph-like data structure indicates the nearest words neighboring the location of the n-gram.

11. The system as in one of claims 8-10, wherein the second feature corresponding to letter case indicates numerical and non-numerical character types, wherein the plurality of letter cases includes upper case(s) and lower case(s).

12. The system of claim 7, wherein the hardware processor is further configured to execute further computer-executable instructions to:
apply optical character recognition to a document image, wherein applying optical character recognition outputs a plurality of document objects; and
apply the trained classification model to the plurality of document objects, wherein applying the trained classification model further comprises:
outputting entities and non-entities with corresponding probabilities indicating a likelihood of correctness for each entity and non-entity.

13. A system comprising:
a data store configured to store computer-executable instructions; and
a hardware processor in communication with the data store, the computing device, when executing the computer-executable instructions, configured to:
receive a collection of training document images;
create a training data set from the collection; and
train a classification model using the training data set, wherein training the classification model further comprises applying at least a plurality of features to the training data set, the plurality of features comprising:
a first feature corresponding to a location of an n-gram,
a second feature corresponding to letter case,
a third feature corresponding to textual character type,
a fourth feature corresponding to a regular expression,
a fifth feature corresponding to a number of characters, and
a sixth feature corresponding to punctuation,
wherein the hardware processor is further configured to execute further computer-executable instructions to:
apply optical character recognition to a document image, wherein applying optical character recognition outputs a plurality of document objects;
apply threshold values to priors of the plurality of document objects;
determine, from the plurality of document objects, a subset of document objects based at least in part on some of the priors of the plurality of document objects not satisfying the threshold values; and
apply the classification model to the subset of document objects.

* * * * *